US009380057B2

(12) United States Patent
Knauss (10) Patent No.: US 9,380,057 B2
(45) Date of Patent: Jun. 28, 2016

(54) SYSTEMS AND METHODS FOR COMBINED OTP AND KBA IDENTITY AUTHENTICATION (71) Applicant: LexisNexis Risk Solutions Inc., Alpharetta, GA (US)

(72) Inventor: Bryan Knauss, Broadlands, VA (US)

(73) Assignee: LEXISNEXIS RISK SOLUTIONS INC., Alpharetta, GA (US)

( * ) Notice: Subject to any disclaimer, the term of this patent is extended or adjusted under 35 U.S.C. 154(b) by 0 days.

(21) Appl. No.: 14/446,007

(22) Filed: Jul. 29, 2014

(65) Prior Publication Data

US 2016/0036807 A1    Feb. 4, 2016

(51) Int. Cl.
*H04L 29/06* (2006.01)
*G06F 21/32* (2013.01)
*G06F 21/42* (2013.01)

(52) U.S. Cl.
CPC ............ *H04L 63/0838* (2013.01); *G06F 21/32* (2013.01); *G06F 21/42* (2013.01); *H04L 63/0861* (2013.01)

(58) Field of Classification Search
CPC . H04L 63/0838; H04L 63/0861; G06F 21/32; G06F 21/42; G06F 21/43
USPC .............. 726/7, 2, 3, 5, 26, 28; 713/182, 184, 713/186
See application file for complete search history.

(56) References Cited

U.S. PATENT DOCUMENTS

| 5,841,871 | A * | 11/1998 | Pinkas ..................... G06F 21/41 709/226 |
| 7,966,649 | B1 * | 6/2011 | Cooper ................. H04L 9/3228 726/17 |
| 8,527,773 | B1 * | 9/2013 | Metzger .................. G06F 21/31 380/255 |
| 8,856,954 | B1 * | 10/2014 | Hathaway ............... G06F 21/31 726/28 |
| 9,032,498 | B1 * | 5/2015 | Ben Ayed ............. H04W 12/06 726/9 |
| 9,047,473 | B2 * | 6/2015 | Samuelsson ............ H04L 9/321 |
| 9,092,599 | B1 * | 7/2015 | Kronrod ................. G06F 21/31 |
| 9,131,374 | B1 * | 9/2015 | Avni ...................... H04W 12/06 |

(Continued)

OTHER PUBLICATIONS

International Search Report in related PCT Application No. PCT/US2015/040493, mailed Oct. 5, 2015.

*Primary Examiner* — Sarah Su
(74) *Attorney, Agent, or Firm* — Troutman Sanders LLP; Ryan A. Schneider; Mark Lehi Jones (57) ABSTRACT Certain implementations include systems and methods for combined one-time-passcode (OTP) and knowledge-based-authentication (KBA) identity authentication. A method is provided that includes receiving a set of identity information associated with a subject; querying one or more databases; receiving personally identifiable information; producing at least one knowledge based authentication (KBA) identity proofing question having a personally identifiable correct answer; generating a unique correct one-time pass (OTP) code for the personally identifiable correct answer; generating one or more incorrect answers with corresponding incorrect codes; outputting, the at least one KBA identity proofing question; outputting the personally identifiable correct answer with the unique correct OTP code, and the one or more incorrect answers with corresponding incorrect codes; receiving a response code; comparing the response code and the unique correct OTP code; and responsive to a match between the response code and the unique correct OTP code, outputting a first indication of authentication.

17 Claims, 7 Drawing Sheets

(56) References Cited

U.S. PATENT DOCUMENTS

| | | | |
|---|---|---|---|
| 9,177,127 B1* | 11/2015 | Dotan | G06F 21/31 |
| 2004/0258281 A1* | 12/2004 | Delgrosso | G06K 9/00973 |
| | | | 382/115 |
| 2005/0039057 A1* | 2/2005 | Bagga | G06F 21/40 |
| | | | 726/19 |
| 2005/0168769 A1* | 8/2005 | Kim | G06F 21/608 |
| | | | 358/1.14 |
| 2007/0172063 A1* | 7/2007 | Biggs | H04L 12/581 |
| | | | 380/255 |
| 2008/0216172 A1* | 9/2008 | Forman | G06F 21/33 |
| | | | 726/21 |
| 2008/0249947 A1 | 10/2008 | Potter | |
| 2009/0249449 A1 | 10/2009 | Shuster | |
| 2009/0276839 A1* | 11/2009 | Peneder | G06F 21/40 |
| | | | 726/8 |
| 2009/0305670 A1* | 12/2009 | DeBoer | G06Q 20/32 |
| | | | 455/411 |
| 2010/0017875 A1* | 1/2010 | Hirakawa | G06F 21/36 |
| | | | 726/19 |
| 2010/0161816 A1 | 6/2010 | Kraft et al. | |
| 2010/0250955 A1 | 9/2010 | Trevithick et al. | |
| 2011/0191838 A1* | 8/2011 | Yanagihara | G06F 15/16 |
| | | | 726/7 |
| 2012/0005733 A1 | 1/2012 | Ross | |
| 2012/0191621 A1 | 7/2012 | Williams et al. | |
| 2013/0174240 A1* | 7/2013 | Bidare | H04L 9/3271 |
| | | | 726/7 |
| 2013/0191898 A1 | 7/2013 | Kraft | |
| 2013/0225129 A1 | 8/2013 | Norbisrath | |
| 2013/0333008 A1* | 12/2013 | Tapling | H04L 63/04 |
| | | | 726/7 |
| 2013/0347129 A1 | 12/2013 | Samuelsson et al. | |
| 2014/0041000 A1 | 2/2014 | Rolfe | |
| 2014/0259130 A1* | 9/2014 | Li | G06F 21/31 |
| | | | 726/6 |
| 2014/0282870 A1* | 9/2014 | Markwordt | H04L 63/08 |
| | | | 726/3 |
| 2014/0359734 A1* | 12/2014 | Natividad | H04L 63/083 |
| | | | 726/6 |
| 2014/0380444 A1* | 12/2014 | Kelley | H04L 63/08 |
| | | | 726/7 |
| 2015/0087265 A1* | 3/2015 | Disraeli | H04L 63/18 |
| | | | 455/411 |
| 2015/0161375 A1* | 6/2015 | Ghosh | G06F 21/36 |
| | | | 726/7 |
| 2015/0186632 A1* | 7/2015 | Liu | H04L 63/08 |
| | | | 726/7 |

* cited by examiner

Subject Data Input

400

| Subject Data Input | Authentication | Results |

Step 1 - Enter subject information. Last 4 SSN, First Name, Last Name, Date of Birth(MM/DD/YYYY)

Language: English

- Reference: _____ (402)
- *Last 4 SSN: _____ (404)
- *First Name: _____ (406)
- *Last Name: _____ (408)
- Street: _____
- Zip: _____      } (410)
- City: _____
- State: _____
- *Date of Birth(MM/DD/YYYY): _____ (412)

[Submit]   [Reset]

SYSTEMS AND METHODS FOR COMBINED OTP AND KBA IDENTITY AUTHENTICATION

FIELD OF THE DISCLOSED TECHNOLOGY

This disclosed technology generally relates to identity authentication, and in particular, to identity authentication utilizing combinations of One-Time Passcode (OTP) and Knowledge Based Authentication (KBA).

BACKGROUND OF THE DISCLOSED TECHNOLOGY

Business entities or governmental agencies that provide services and/or benefits to customers typically have a need to authenticate their customer's identities to avoid losses to perpetrators of identity-related fraud. Identity fraud presents difficult challenges for entities who unknowingly open or allow access to accounts based on synthetic, stolen, or manipulated identity information. Technically well-informed fraud perpetrators continue to develop sophisticated deception schemes to target authentication techniques that were once thought to be secure. Balancing the threats of identity fraud with efficient service for legitimate clients presents significant challenges for businesses and governmental agencies.

BRIEF SUMMARY OF THE DISCLOSED TECHNOLOGY

Some or all of the above needs may be addressed by certain implementations of the disclosed technology. Systems and methods are disclosed herein for implementing an authentication process that combines one-time passcode (OTP) and knowledge based authentication (KBA) to provide an efficient and secure authentication process.

In an example implementation, a computer-implemented method is provided that includes receiving a set of identity information associated with a subject; querying one or more databases with at least a portion of the set of identity information; receiving, in response to the querying, personally identifiable information; producing, with one or more computer processors, and based at least in part on the personally identifiable information, at least one knowledge based authentication (KBA) identity proofing question having a personally identifiable correct answer; generating a unique correct one-time pass (OTP) code for the personally identifiable correct answer; generating one or more incorrect answers with corresponding incorrect codes; outputting, via a first communication channel, the at least one KBA identity proofing question; outputting, via a second communication channel, the personally identifiable correct answer with the unique correct OTP code, and the one or more incorrect answers with corresponding incorrect codes; receiving, via the first communication channel, a response code; comparing the response code and the unique correct OTP code; and responsive to a match between the response code and the unique correct OTP code, outputting a first indication of authentication.

According to another example implementation, a system is provided. The system includes at least one memory for storing data and computer-executable instructions; and at least one processor configured to access the at least one memory and further configured to execute the computer-executable instructions to: receive a set of identity information associated with a subject; query one or more databases with at least a portion of the set of identity information; receive, in response to the querying, personally identifiable information; produce, with one or more computer processors, and based at least in part on the personally identifiable information, at least one knowledge based authentication (KBA) identity proofing question having a personally identifiable correct answer; generate a unique correct one-time pass (OTP) code for the personally identifiable correct answer; generate one or more incorrect answers with corresponding incorrect codes; output, via a first communication channel, the at least one KBA identity proofing question; output, via a second communication channel, the personally identifiable correct answer with the unique correct OTP code, and the one or more incorrect answers with corresponding incorrect codes; receive, via the first communication channel, a response code; compare the response code and the unique correct OTP code; and responsive to a match between the response code and the unique correct OTP code, output a first indication of authentication.

According to another example implementation, computer-readable media is provided. The computer-readable media includes computer-executable instructions that, when executed by one or more processors, cause the one or more processors to perform a method comprising: receiving a set of identity information associated with a subject; querying one or more databases with at least a portion of the set of identity information; receiving, in response to the querying, personally identifiable information; producing, with one or more computer processors, and based at least in part on the personally identifiable information, at least one knowledge based authentication (KBA) identity proofing question having a personally identifiable correct answer; generating a unique correct one-time pass (OTP) code for the personally identifiable correct answer; generating one or more incorrect answers with corresponding incorrect codes; outputting, via a first communication channel, the at least one KBA identity proofing question; outputting, via a second communication channel, the personally identifiable correct answer with the unique correct OTP code, and the one or more incorrect answers with corresponding incorrect codes; receiving, via the first communication channel, a response code; comparing the response code and the unique correct OTP code; and responsive to a match between the response code and the unique correct OTP code, outputting a first indication of authentication.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology will be described more fully hereinafter with reference to the accompanying drawings, in which various embodiments of the disclosed technology are depicted. This disclosed technology may, however, be embodied in many different forms and should not be construed as limited to the implementations set forth herein; rather, these implementations are provided so that this disclosure will be thorough and complete, and will convey the scope of the disclosed technology to those skilled in the art.

Certain example implementations of the disclosed technology may be utilized to improve authentication security and efficiency via a combination of One Time Passcode (OTP) and Knowledge Based Authentication (KBA) solutions into a single authentication process. In accordance with an example implementation, a plurality OTP codes with a corresponding plurality of OTP messages may be provided as "multiple-choice" answers to a KBA question, where the KBA question is generated based on personally identifiable information (i.e., information that could be easily answered by an authentic subject, but would require a perpetrator of identity fraud to guess the correct answer or perform extensive research). In an example implementation, a subject may respond to the KBA question by entering one of the plurality of OTP codes. Entering a correct code to one or more KBA questions, for example, may be utilized to authenticate a subject's identity. In certain example implementations, authentication of the subject may be confirmed if the subject provides the correct OTP code to the KBA question.

According to certain example implementations of the disclosed technology, the KBA question may be based on retrieved information, for example, from one or more of:

shared secrets provided by the user in a previous session;
private data about the user or account held by an organization such a transactional activity, account opening date, or co-owners of the account;
aggregated data from sources such as a commercially available data, credit file information such as trade line data, and/or credit bureau data that may include address history, relatives, property ownership, etc.;
aggregated from public records, for example, from county tax and property records, court records, driver's license records, utility records, etc.

In certain example embodiments, the KBA question may be based on derived data from the retrieved information. For example, a public record source may be utilized to retrieve an address of the subject, then geospatial data may be utilized to find business around the address to generate a KBA question such as: "which of the following hospitals is closest to your home address?"

According to an example implementation, the KBA question, OPT codes, and/or OTP messages may be sent to a subject using various so-called "out-of-band" communication channels or combinations of channels such as by phone, email, physical mail, SMS messaging, URL access, etc. For example, in one implementation, the KBA question may be sent or presented to a subject using one communication channel or device (such as via a browser on a desktop computer) while the OPT messages/codes may be sent or presented to the subject using another communication channel or device (such as via a text message on a smart phone). Such multi-channel/device communications may provide a "possession" factor for security in an authentication process.

In accordance with an example implementation of the disclosed technology, a "knowledge" factor may be provided via the KBA portion of the combined KBA and OTP authentication implementation. The "knowledge" factor provided by the KBA may add another layer of security in addition to the above-mentioned "possession" factor. KBA questions are sometimes referred to as "out-of-wallet" and may be used to verify "something that the subject knows" in the authentication process. Certain example implementations of the technology may include a KBA question that is suitable for a fill-in-the-blank answer by a subject. Certain example implementations may include a KBA question that is suitable for a multiple-choice answer by a subject.

OTP and KBA, when used separately, provide moderate security in single factor authentication. Certain example implementations of the disclosed technology combine the two techniques to provide a high-security, two-factor solution of the possession and knowledge factors. One objective of the disclosed technology is to raise the strength and security of the authentication found with any two-factor solution by forcing an imposter to compromise more than one dimension of the victim. As OTP has become more widely adopted by financial institutions looking to prevent identity theft, fraudsters have adjusted their techniques in compromising the authentication. For example, fraudsters may utilize SMS forwarding or a Trojan program that suppresses and forwards OTP messages to another device controlled by the fraudster. Likewise, a standalone KBA process may be defeated by fraudsters who perform target research on the victim to learn the answers of life questions. By combining the OTP and KBA techniques, the combined strength of both solutions can be leveraged in a way that makes impersonation more difficult than either technique on its own. Certain example implementations of the disclosed technology present to the subject multiple passcode options that are coupled with answers to a KBA question so that the user must select the correct OTP message to use based on their memory.

Various systems and methods may be utilized for the authentication process, according to example implementations of the disclosed technology, and will now be described with reference to the accompanying figures.

Figure 1:
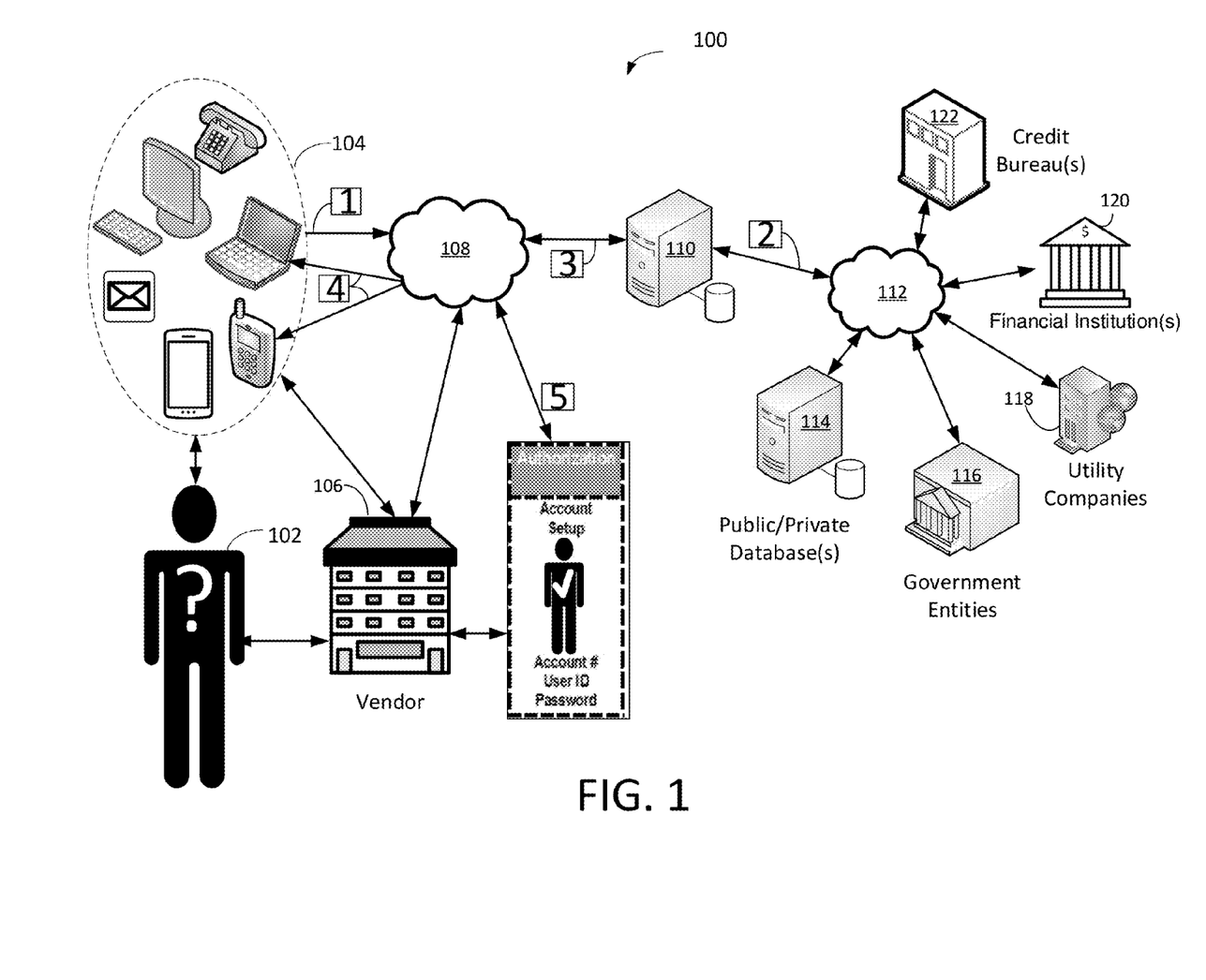
FIG. 1 is a block diagram of an illustrative identity authentication process 100 according to an example implementation of the disclosed technology.

FIG. 1 depicts an illustrative identity authentication process 100, according to an example implementation of the disclosed technology. Certain example implementations of the process 100 may be used to verify the identity of the subject 102 using a combined KBA and OTP authorization process.

According to an example implementation, the subject 102 may provide identity information for initiating the authentication process 100 using one or more communication channels and/or devices 104. For example, in one implementation, the set of identity information may include basic details, such as a name, address, date of birth, social security number, location, etc. In certain example embodiments, the subject 102 may provide a set of identity information (such as will be discussed with reference to FIG. 4 below) via a telephone, desktop computer, smart-phone, laptop computer, tablet-computing device, paper application, mail, etc. In certain example implementations, all or a portion of the set of identity information may be input directly into one or more webpage forms for online processing. In certain example implementations, all or part of the set of identity information related to the subject 102 may be stored with a vendor 106 and/or a server 110 for subsequent retrieval and use.

In an example implementation, the received set of identity information may also include information that may directly or indirectly identify certain characteristics about the communication channel and/or device 104 used by the subject 102, such as a phone number, IP address, MAC address, location, signal-to-noise, unique browser configuration, operating system, installed fonts, installed plug-ins, etc. In an example implementation, the characteristics about the communication channel or device 104 may be utilized in conjunction with the basic details received from the subject 102 to determine one or more of:

if the received phone number associated with the communication channel or device 104 differs or is altered in some way from the originating device phone number (i.e. spoofed);

if the subject's 102 communication device 104 is located where it would be expected to be (i.e., within the home city or state of the subject 102);

if the subject's 102 communication device 104 is located in a region associated with a high crime rate;

if the subject's 102 communication device 104 is located in foreign country;

details about the subject's 102 communication device 104 (i.e., device fingerprinting) that may be corroborated by independent information.

According to an example implementation of the disclosed technology, the information received, gathered, and/or determined may be analyzed, compared, etc., to calculate a fraud risk score. In an example implementation, if the fraud risk score is determined to exceed a threshold (i.e., to be more risky than acceptable), the process 100 may prevent or block additional authentication steps and an indication of failure may be output. For example, in situations where the risk is determined to be higher than acceptable, the subject 102 may be presented with other options or instructions to validate his or her identity.

In certain example implementations, initiating the initial and/or additional authentication process steps may be based on company or governmental oversight policy rather than on a risk score. For example, in order to conform to certain state laws, an authentication challenge method to verify identity may need to be based on commercially reasonable tools. In other situations, and depending on the particular business policy, certain transactions may require a specific type of authentication. For example, certain banks may require authentication with a KBA challenge question for balance transfers over $10,000.

Certain example implementations of the disclosed identity authentication process 100 may be described in terms of multiple stages, for example, as shown by the boxed numerals [1], [2], [3], [4], and [5] in FIG. 1. Stage [1], for example, may include receiving a set of identity information associated with a subject 102. According to an example implementation, the set of identity information may include the above-referenced characteristics about the communication channel or device 104. Such information may be received via a cloud or Internet communication channel 108. In one example implementation, the set of identity information may be received at a server 110 in response to input from a subject 102. In another example implementation, the set of identity information may be received at a server 110 via a vendor 106 in communication with the subject 102.

In accordance with an example implementation, a vendor 106 may connect to the cloud or Internet communication channel 108 through a similar list of its own communication channel or device 104. For example, the vendor 106 may have its own webserver or mobile device that connects to the cloud or Internet communication channel 108 using a variety of device options.

According to an example implementation of the disclosed technology, Stage [2] of the process 100 may include querying one or more databases with at least a portion of the set of identity information to obtain personally identifiable information. For example, the one or more databases may include one or more of the following: a public or private database 114, a database associated with a governmental entity 116, a database associated with a utility company 118, a database associated with a financial institution 120, a database associated with a credit bureau 122, etc. In an example implementation, information obtained from one or more of the databases 114-122 (for example, via a cloud, network and/or Internet connection 112) may be stored on a server 110 and indexed in a database associated with the server 110.

According to an example implementation of the disclosed technology, Stage [3] of the process 100 may include producing, based at least in part on the personally identifiable information, at least one knowledge based authentication (KBA) identity proofing question having a personally identifiable correct answer. In certain example implementations, Stage [3] may also include generating a unique correct one-time pass (OTP) code for the personally identifiable correct answer. In certain example implementations, Stage [3] may also include generating one or more incorrect answers with corresponding incorrect codes. According to an example implementation of the disclosed technology, the generation of the KBA question and/or the OTP answers and codes may be performed by the server 110.

According to an example implementation of the disclosed technology, Stage [4] of the process 100 may include outputting, via a first communication channel, the at least one KBA identity proofing question. In certain example implementations, Stage [4] may include outputting, via a second communication channel, the personally identifiable correct answer with the unique correct OTP code, and the one or more incorrect answers with corresponding incorrect alphanumeric codes. In certain example implementations, Stage [4] may include receiving a response code and comparing the response code and the unique correct OTP code.

According to an example implementation of the disclosed technology, Stage [5] of the process 100 may include outputting a first indication of authentication responsive to a match between the response code and the unique correct OTP code. Depending on analysis of the various response codes or other factors where risk is determined to be higher than acceptable, the subject 102 may be presented with other options or instructions to validate his or her identity. For example, certain embodiments may include online or offline capture of identification documents (such as a driver's license, social security card, credit card, bankcard, utility bill, tax return, etc.,) for further identity verification.

In accordance with an example implementation, the identity authentication process 100 may utilize all or part of the previously gathered, compared, analyzed, and/or scored information to determine a fraud risk score. In certain example implementations, the fraud risk score may provide additional confidence for accepting or rejecting the authentication.

According to an example implementation of the disclosed technology, if the received response code is determined to correspond to the correct OTP code for the personally identifiable correct answer, the process 100 may further include initiating biometric capture of the subject. For example, in certain example implementations, biometric capture may be used to associate the subject 102 identity information with some type of physically verifiable (biometric) information, such as a fingerprint, a voice print, an iris image, a facial image, etc.

In certain example implementations, once the subject 102 satisfactorily completes the authentication process 100, future access to an account, benefit and/or service may be granted based on information such as a device ID, biometric information, etc., without having to repeat a full re-authentication process. In certain example implementations, additional verification and/or identity proofing may be triggered before granting access to an account, benefit and/or service. For example, if an authenticated subject 102 attempts to access their account from a different or unknown device or communications channel 104, one or more of the previously described Stages [1]-[5] may be repeated. In certain example embodiments, periodic identity proofing questions, one-time passwords, multi-factor authorization, etc., may be presented to the subject 102 for completion before access to the account or service is granted.

Figure 2:
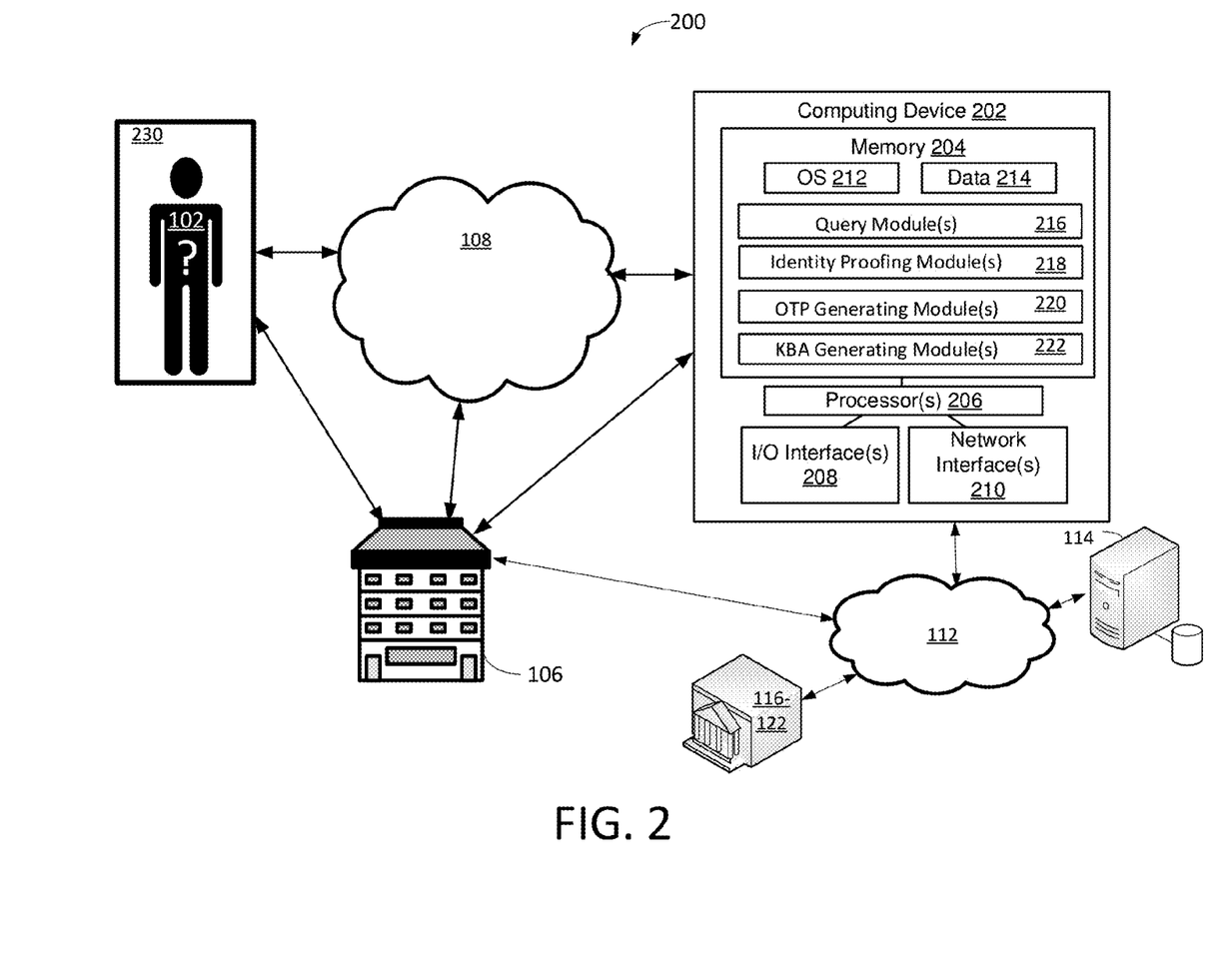
FIG. 2 is a block diagram of an example system 200 for implementing an identity authentication process according to an example implementation of the disclosed technology.

FIG. 2 is a block diagram of an example system 200 for implementing an identity authentication process, according to an example implementation of the disclosed technology. The system 200 may utilize a computing device 202 for handling various aspects of the process, including communicating with the various entities and/or external systems involved in the authentication process. For example, the computing device 202 may communicate via one or more cloud, Internet, or other network channels 108 112 to send and/or receive information. For example, the computing device 202 may receive identity information 230 related to the subject 102. Such identity information 230 may include a set of identity information received from the subject 102 (for example, to initiate the authentication process) as well as independent information received in response to querying one or more public or private databases 114 116-122.

In certain example implementations, the computing device may include one or more input/output interfaces 208 and/or network interfaces 210 for communicating with the various systems and/or entities in the authentication process. According to an example implementation of the disclosed technology, the computing device 202 may be in communication with clients or vendors 106, either directly, or via a cloud, Internet, or other network channel 108 112. For example, a subject 102 seeking to open an account or to do business with a particular vendor 106 may need to go through an authorization process dictated by the vendor 106, where one or more authentication steps or stages are handled by the system 200.

In certain example implementations, the computing device 202 may be utilized to initiate authentication and/or receive information from various devices, including but not limited to card readers, fingerprint scanners, text input devices, cameras, microphones, etc. In certain example implementations of the disclosed technology, the computing device may receive information such as passcodes, authentication query responses, and/or data representative of biometric information (such as fingerprint or voiceprint information).

In an example implementation, the computing device 202 may include memory 204 in communication with one or more processors 206. The memory 204 may be configured to host an operating system 212 and data 214. Certain example implementations of the disclosed technology may include various modules 216 218 220 222 for processing the various stages of the authentication process. For example, the memory 204 may include one or more query modules 216 for formatting KBA questions. In certain example implementations, the query module 216 may be utilized to dictate which communication channels are utilized for presenting the KBA question and the OTP codes.

In an example implementation, the memory 204 may include one or more identity proofing modules 218, for example, to compare the response code and the unique correct OTP code. In certain example implementations of the disclosed technology, the memory 204 may include one or more OTP generating modules 220, for example, to generate a unique correct one-time pass (OTP) code for the personally identifiable correct answer, and/or for generating one or more incorrect answers with corresponding incorrect codes. According to an example implementation of the disclosed technology, the computing device 202 may be configured with one or more KBA generating modules 222, for example, to produce knowledge based authentication (KBA) identity proofing questions. In certain example implementations, the computing device 202 may be additionally configured with one or more biometric modules (not shown) for example, to handle the biometric capture.

Figure 3:
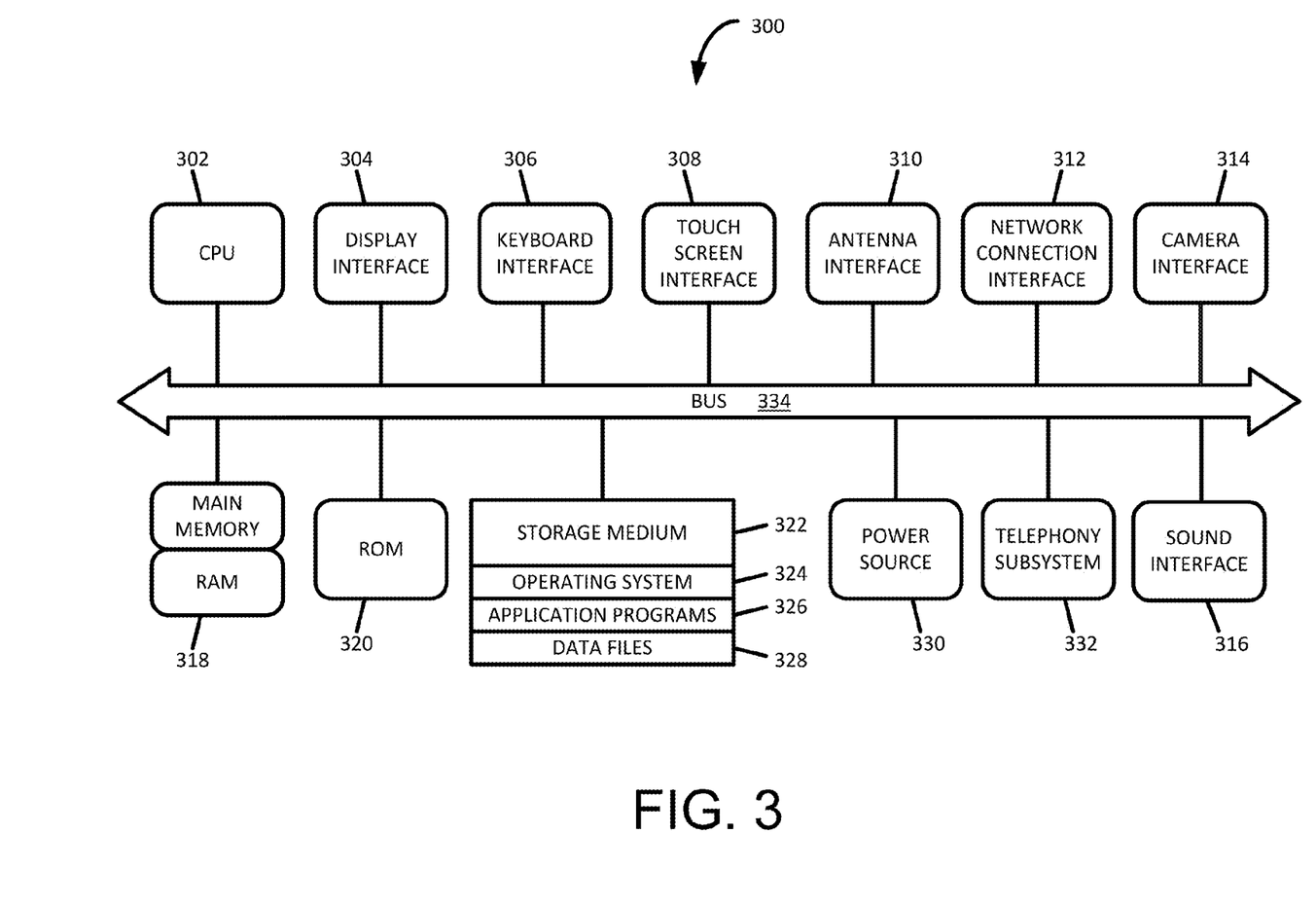
FIG. 3 is a block diagram of a computing device 300, according to an example implementation of the disclosed technology.

FIG. 3 is a block diagram of an illustrative computing device 300, according to an example implementation of the disclosed technology. In certain example implementations, the computing device 300 may be embodied as the computing device 202, as shown in FIG. 2. The computing device 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display that is not necessarily physically connected to the computing device. For example, a desktop monitor may be utilized for mirroring graphics and other information that is presented on the computing device 300. In certain example implementations, the display interface 304 may wirelessly communicate, for example, via a Wi-Fi channel or other available network connection interface 312 to an external/remote display.

In an example implementation, the network connection interface 312 may be configured as a communication interface, for example, to provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 300 may include a keyboard interface 306 that provides a communication interface to a keyboard. In one example implementation, the computing device 300 may include a pointing device and/or touch screen interface 308. According to certain example implementations of the disclosed technology, the pointing device and/or touch screen interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the touch screen interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor such as an accelerometer or gyroscope, a smartcard, iris reader, fingerprint reader, voice-print reader, and the like. Additionally, the input device may be integrated with the computing device 300 or may be a separate device.

Example implementations of the computing device 300 may include an antenna interface 310 that provides a communication interface to an antenna; a network connection interface 312 that provides a communication interface to a network. In certain implementations, a camera interface 314 is provided for capturing digital images, for example, from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, an invoice extraction module, etc.) and data files 328 are stored. According to an example implementation, the computing device 300 includes a power source 330 that provides an appropriate alternating current (AC) or direct current (DC) to power components. According to an example implementation, the computing device 300 may include and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like (such as the modules 216-222 as discussed with respect to FIG. 2) that are stored on removable and non-removable memory media, to off-load data from the device 300 or to upload data onto the device 300. A computer program product, such as one utilizing a communication system may be tangibly embodied in storage medium 322, which may comprise a machine-readable storage medium.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

Figure 4:
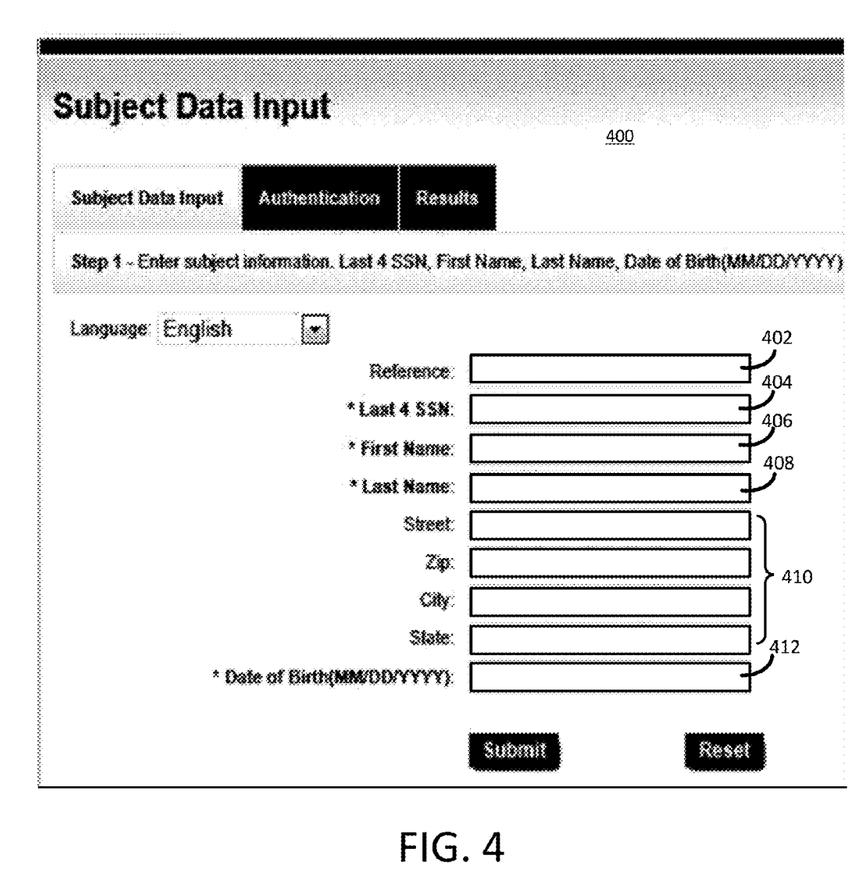
FIG. 4 depicts a data input graphical user interface 400, according to an example implementation of the disclosed technology.

FIG. 4 depicts an example data input graphical user interface 400, according to an example implementation of the disclosed technology. Certain example implementations of the disclosed technology may utilize the same or similar graphical user interfaces for receiving input related to authentication. For example, as discussed with reference to FIG. 1, the subject 102 may provide a set of identity information, and the graphical user interface 400 may provide a convenient input medium for obtaining the information. In certain example implementations, and as depicted by the * in some of the input fields 404 406 408 412 shown in FIG. 4, certain information may be required, such as a portion of the subject's social security number 404, a first name 406, a last name 408, and a date of birth 412. According to an example implementation of the disclosed technology, the graphical user interface 400 may include fields for optional or additional information that may be utilized for further selectivity in identifying independent information about the subject. For example, the graphical user interface 400 may include a reference field 402. In an example implementation, the graphical user interface 400 may include input fields for the subject's residence or mailing address 410.

It will be recognized by those of skill in the art that the graphical user interface 400 may include more or less of the input fields illustrated in FIG. 4. For example, certain implementations may include subject data input field(s) for inputting a phone number. Certain implementation may include fields for inputting other subject data such as, but not limited to account numbers, dates, locations, relative names, relative addresses, etc. Certain example implementations may include vendor-specific custom fields for input.

Figure 5:
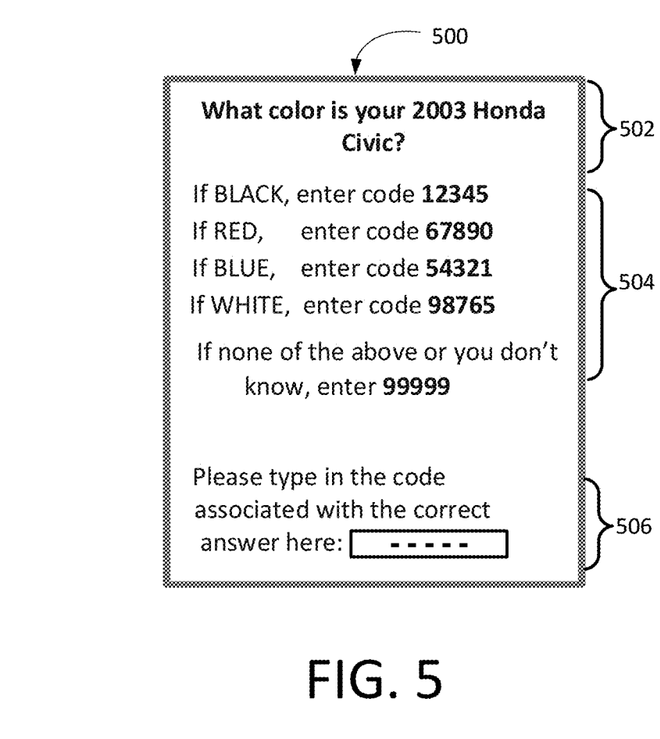
FIG. 5 depicts an example graphical user interface 500 for single device authentication, according to an example implementation of the disclosed technology.

FIG. 5 depicts an example graphical user interface 500 for single device authentication, according to an example implementation of the disclosed technology. In one example implementation, the graphical user interface 500 may be output for display on a communication device, for example, when a high-risk event is encountered online where a commercial, private, or governmental entity wishes to authenticate a subject. In an example implementation, a question 502 may be presented, such as "What color is your 2003 Honda Civic?" with possible response answers and associated codes 504 enumerated for the subject, for example: "If BLACK, enter code 12345; If RED, enter code 67890; If BLUE, enter 54321; If WHITE, enter 98765; If none of the above or you don't know, enter 99999." In accordance with an example implementation of the disclosed technology, the graphical user interface 500 may include a field 506 for inputting a response code, and may include instructions such as "Please type in the answer associated with the correct answer here: _______."

In accordance with an example implementation of the disclosed technology, the subject may then input a code corresponding to a correct answer based on their knowledge of their vehicle, thereby proving the possession factor of the communication device (since they received the answer set) and the knowledge factor (by isolating the correct code out of the plurality of codes). According to an example implementation of the disclosed technology, the process in this example can also be delivered via an out-of-band phone call, for example, where the information is communicated to the user audibly through the phone. In certain example implementations, answers coupled with response codes may be delivered to the subject via a email, physical mail, etc.

As discussed above, and as will be understood by those of skill in the art, the question 502 presented to the subject (such as the example question above relating to the "2003 Honda Civic") may be based on personally identifiable information that was gathered in response to querying of one or more private or public databases with the received subject's identity information. In one example implementation, such a question 502 may intentionally include erroneous or random information in which a correct response code may be "99999". In another example implementation, if the personally identifiable information returned can, with confidence, verify that the subject indeed owns (or has owned) a "2003 Honda Civic," and if the personally identifiable information includes color information about the vehicle, then one of the response codes corresponding to the color of the vehicle may be the correct response code. In certain example implementations, it is possible that more than one of the response codes could be considered correct. For example, if the personally identifiable verifies that the subject owns (or owned) a black 2004 Honda Civic, but the KBA question refers to a 2003 Honda Civic, then the system may be setup to accept either "99999" or "12345" as a correct response code. It should be understood that the example provided above is for explanation purposes, and does not limit the types of KBA questions, answers, or codes according to the various example embodiments of the disclosed technology.

Not only is there no limit on types of KBA questions, but also the number of multiple-choice answers presented with the KBA questions is not limited. In one example implementation, two KBA questions may be used, each with its set of codes to reduce threat of authenticating someone who has stolen the device and is guessing the answer. For example, if the first KBA question includes five multiple-choice answers, the person being validated has 20% chance of guessing the correct answer. If another KBA question is posed with five more multiple-choice questions, the person being validated may have a 4% chance of correctly guessing both answers by random selection. In another example implementation, to reduce the likelihood of guessing correctly, a KBA question may be posed with more multiple-choice answers (such as 10 or 20 answers to choose from). The questions can be presented one at a time in a loop until pass/fail criteria is achieved.

In another example implementation, two questions may be presented (such as "what is your eye color?" and "what is the color of your 2009 vehicle?") with a corresponding set of answers, (e.g., black, brown, green, gray, blue) and code entry instructions such as "what is the correct answer code to the first question?" and "what is the correct answer code to the second question?" The subject may then utilize the same answer set but may be required to enter the right code for the right question in the right order.

Figure 6:
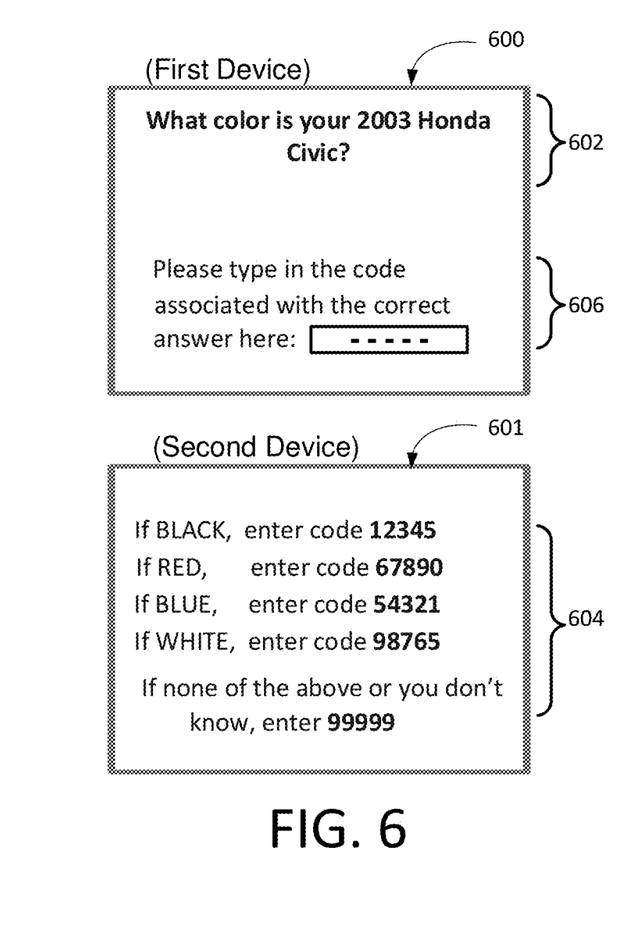
FIG. 6 depicts example graphical user interfaces 600 601 for dual device authentication, according to an example implementation of the disclosed technology.

FIG. 6 depicts example graphical user interfaces (GUIs) for dual device (or dual communication channel) authentication. According to an example implementation of the disclosed technology, the first GUI may represent an output screen of a first communication device/channel 600 that is accessible by, owned by, in possession of, and/or otherwise associated with the subject; while the second GUI may represent an output screen of a second communication device/channel 601 that differs from the first communication device/channel 600. In an example implementation, the second communication device/channel 601 may also be accessible by, owned by, in possession of, and/or otherwise associated with the subject. One main difference between the example implementations described in FIGS. 5 and 6 is that the example separate communication devices/channels 600 601 as depicted in FIG. 6 are utilized to separate the devices/channels so that the KBA question 602 is sent to the first communication device/channel 600, while the answers and/or codes 604 are sent to a second communication device/channel 601. As may be appreciated by those of skill in the art, each additional communication device/channel that is utilized in the authentication process adds an additional layer of security to the whole process. Certain example embodiments of the disclosed technology may utilize two or more communication devices/channels to achieve enhanced authentication security.

In another example implementation, one of the GUIs (for example, the GUI associated with the first communication device/channel 600) may represent an output screen of a first communication device 600 (such as a laptop, smart phone, tablet, kiosk, etc.) that is accessible by the subject, while the other GUI (for example, the GUI associated with the second communication device/channel 601) may represent audible prompts received by a second device 601 (such as a telephone, different kiosk, etc.) that is also accessible by the subject. According to an example implementation of the disclosed technology, by sending the KBA question to one device (or via one communication channel), while sending the OTP codes to another device (or via another communication channel), the security associated with the "possession factor" of the communication device/channel may be increased.

Another example implementation variation of the disclosed technology may include sending the KBA question 602 and corresponding answers (without codes) to the subject through a first communication device/channel 600 and delivering the answer codes in order (without answers) via the second communication device/channel 601. In one example implementation variation, the input interface 606 for providing the input code may be done via the first communication device/channel 600. In another example implementation variation, the input interface 606 for providing the input code may be done via the second communication device/channel 601.

Another example implementation variation of the disclosed technology may include sending the KBA question 602 to the subject for presentation with each answer labeled (e.g., A, B, C) and linked to the OTP codes (A=12345, B=12342, etc). In one example implementation, this "linked code" variation may be handled by a single communication device/channel. In another example implementation, this "linked code" variation may be handled similarly to the dual device authentication implementations as described above.

In certain example implementations, SMS text messages may be utilized in the authentication process. For example, the individual answers linked with corresponding codes 604 may be sent one SMS message at a time. In another example implementation, all of the answers corresponding codes 604 may be sent within a single SMS. In accordance with an example implementation, all or part of the authorization process, as disclosed herein, may be handled via online applications, mobile applications, kiosks, interactive voice response (IVR), via a call center agent, live operator, etc.

Figure 7:
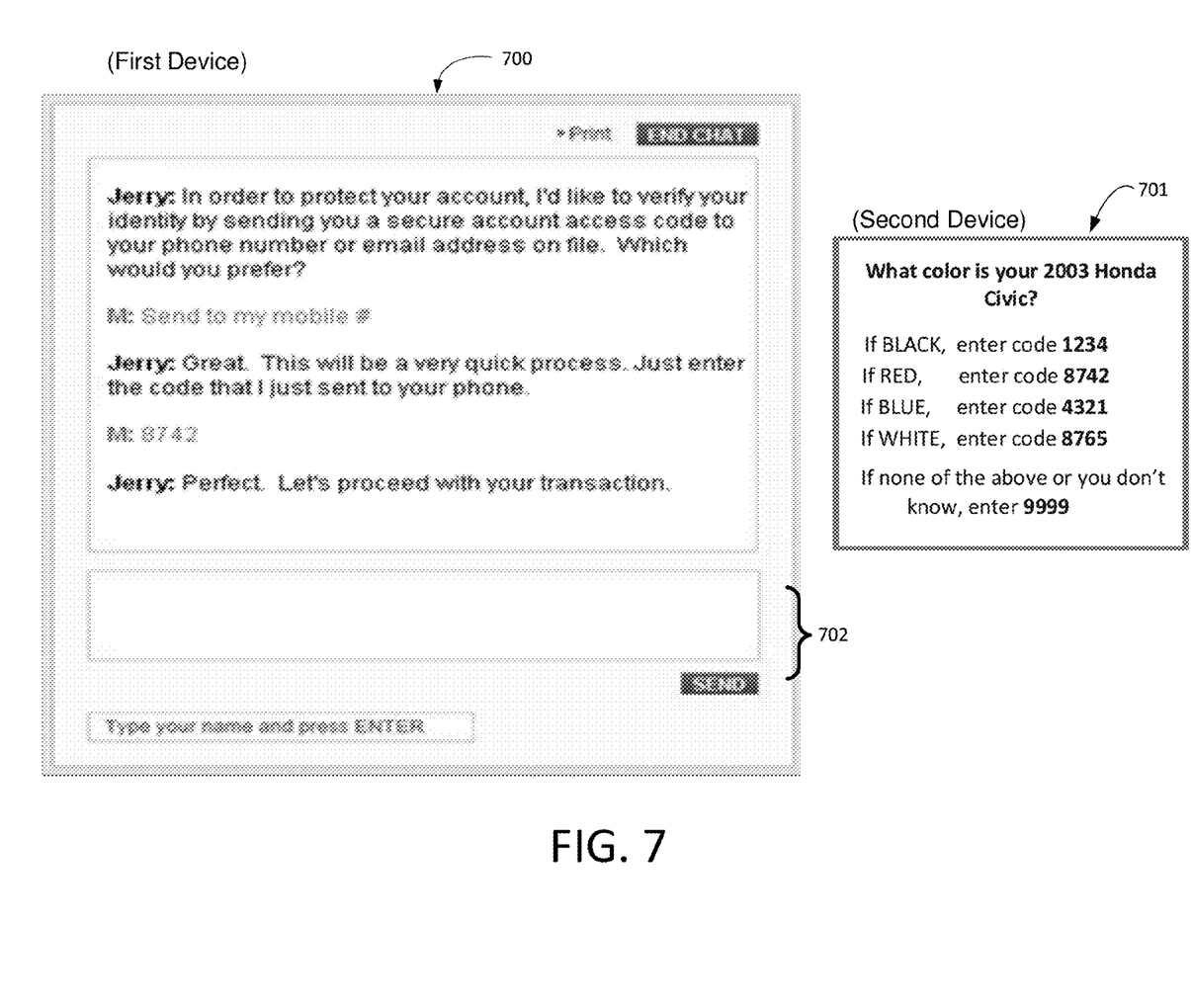
FIG. 7 depicts example graphical user interfaces 700 701 for authentication, according to an example implementation of the disclosed technology.

FIG. 7 depicts another example implementation of the disclosed technology in which a GUI associated with a chat session 700 (i.e., first device or communication channel) is utilized with a GUI associated with a second device or communication channel 701 for authentication. In this example implementation, a representative (or computer) associated with a company or governmental entity may initiate authentication of a subject by providing the text, as shown in the chat session 700 GUI of FIG. 7. For example, the GUI associated with a chat session 700 may indicate that a KBA question and series of possible answers (with codes) will be sent to the subject's second device 701. In an example implementation, the subject may also be instructed to enter the code associated with the right answer to the question in an entry region 702. For example, in one implementation, the chat session 700 GUI may display text similar to "In order to protect you from fraud and for the security of your account, we need to verify your identity by sending you answers to the question displayed below via text message to the mobile number you have registered." In another example implementation, the chat session 700 GUI may display text similar to "In order to protect you from fraud and for the security of your account, we need to verify your identity by sending you a question with possible answers via text message to the mobile number you have registered." In certain example implementations, the subject may be instructed to "Please type in the code associated with the right answer."

According to an example implementation of the disclosed technology, the subject may then select the right answer based on their knowledge, and they may enter the correct passcode into the appropriate field, thereby proving the possession factor of the second device 701. The knowledge factor may be verified if the subject enters the correct code from the plurality of codes.

According to an example implementation of the disclosed technology, all or part of process described above with reference to FIG. 7 may be delivered via an "out-of-band" phone call, for example, where the information is communicated to the user audibly through the phone. In another example implementation, the answers coupled with passcodes may be delivered to the user via email or physical mail (e.g., USPS, FedEx).

Figure 8:
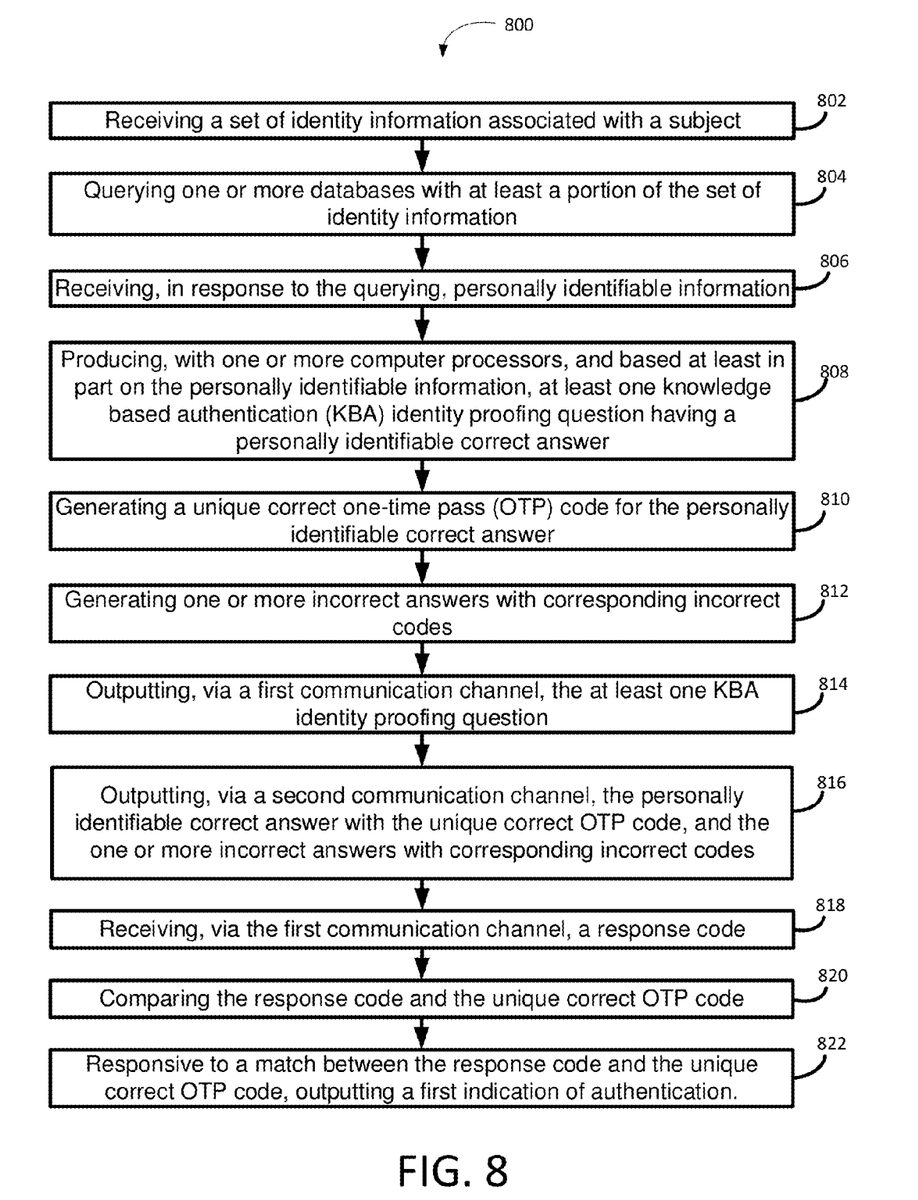
FIG. 8 is a flow diagram of a method 800, according to an example implementation of the disclosed technology.

FIG. 8 is a flow diagram of a method 800, according to an example implementation of the disclosed technology. The method 800 begins in block 802 and includes receiving a set of identity information associated with a subject. In block 804, the method 800 includes querying one or more databases with at least a portion of the set of identity information. In block 806, the method 800 includes receiving, in response to the querying, personally identifiable information. In block 808, the method 800 includes producing, with one or more computer processors, and based at least in part on the personally identifiable information, at least one knowledge based authentication (KBA) identity proofing question having a personally identifiable correct answer. In block 810, method 800 includes generating a unique correct one-time pass (OTP) code for the personally identifiable correct answer. In block 812, the method 800 includes generating one or more incorrect answers with corresponding incorrect codes. In block 814, the method 800 includes outputting, via a first communication channel, the at least one KBA identity proofing question. In block 816, the method 800 includes outputting, via a second communication channel, the personally identifiable correct answer with the unique correct OTP code, and the one or more incorrect answers with corresponding incorrect codes. In block 818, the method 800 includes receiving, via the first communication channel, a response code. In block 820, the method 800 includes comparing the response code and the unique correct OTP code. In block 822, the method 800 includes responsive to a match between the response code and the unique correct OTP code, outputting a first indication of authentication.

Certain example implementations of the disclosed technology may further include receiving new biometric information associated with the subject. An example implementation includes querying one or more databases for previously stored biometric information associated with the subject. An example implementation includes comparing the new biometric information with the previously store biometric information. Responsive to a match between the new and previously stored biometric information, an example implementation includes outputting a second indication of authentication.

According to an example implementation of the disclosed technology, the biometric information can include one or more of a fingerprint image, a voiceprint, a facial feature image, and an iris image.

Certain example implementations of the disclosed technology may further include outputting a mismatch indication responsive to one or more of a comparison mismatch between the new and previously stored biometric information and a comparison mismatch between the response code and the unique correct OTP alphanumeric code.

According to an example implementation of the disclosed technology, receiving the set of identity information can include receiving, as applicable, one or more of: a name, an address, a birth date, a phone number, at least portion of a social security number, an IP address, a location, and a communication device electronic fingerprint.

In an example implementation, the first and second communication channel are the same communication channel.

In an example implementation, the first communication channel is configured for communication with a first computing device associated with the subject, and wherein the second communication channel is configured for communication with a second computing device associated with the subject.

According to an example implementation of the disclosed technology, the unique correct one-time pass (OTP) code and the incorrect codes comprise one or more alphanumeric codes, numbers, or letters.

Certain example implementations of the disclosed technology may enable effective determination and management of identity fraud risk. Certain implementations may be utilized to detect suspicious and/or fraudulent activities associated with the process of establishing a new account. For example, a subject seeking to establish a new account (such as a credit account, banking account, utility account, etc.) or apply for a benefit or service (such as a tax refund, etc.) may provide a basic set of identity information such as a name, address, telephone number, social security number, etc. In an example implementation, all or part of the set of identity information may be utilized to query one or more public and/or private databases to obtain independent information. In certain example implementations, the independent information may be processed to determine/detect/score indicators of risk. According to an example implementation of the disclosed technology, account applicants who fail the authentication may not be allowed to proceed.

Certain example embodiments of the disclosed technology may allow for offline, manual, and/or custom validation of a subject's identity when the subject fails the authentication. For example, certain legitimate subjects may fail due to various factors. In these situations, it may be possible to obtain the appropriate authentication by offline, manual, and/or custom validation. For example, in one implementation, a subject who fails authentication may be asked to provide additional proof of their identity. In another example implementation, a subject who fails one of the stages may be asked to appear in person at a vendor location for further questioning and/or documentation.

Certain embodiments utilize non-fair credit reporting act (non-FCRA) implementations, for example, so if a subject fails one or more stages, such information will not be utilized for denying employment, credit, etc. In such situations, a vendor for which the subject is seeking authentication may provide other offline, manual, and/or custom validation options. However, if the subject passes the authentication, then the process may be utilized to initiate authentication, such as biometric authentication. Furthermore, if the subject passes the authentication process, certain implementations of the disclosed technology may provide an efficient means for identity authentication.

Certain example implementations may identify specific types of possible identity fraud and risk levels associated with a subject. For example, personal information submitted with an application may be analyzed with respect to available information in public and/or non-public records to determine the authenticity of the subject's identity and/or the applicant data. According to certain implementations, the analysis may involve comparisons on multiple levels using models specific to the type of risk identified. According to certain implementations, the analysis may further identify discrepancies (if any), categorize the type of possible fraud, score the risk of fraud, and/or further evaluate the application information based on the type of risk.

Certain example implementations of the disclosed technology use OTP, which can refer to a password that can be used by a subject to authenticate an account or service. In one example implementation, a subject may only use the OTP a single time so that future access to the account cannot be gained by use of the same OTP. In certain example implementations, the OPT can be set to expire within a predetermined period. In an example implementation, the OTP may be utilized to authenticate a service or account. For example, a subject may be asked to provide the OTP to access a service, or when a specific transaction is performed. Examples of use cases where the OTP may be utilized includes online banking services, a telephone banking service, an interactive voice response (IVR) banking service, a credit card service, a bill payment service, or any other service in which a subject is able to provide and/or receive sensitive information.

In certain example implementations, the OTPs generated by the authentication system can take on various forms. For example, in one implementation, the OTPs may be six characters in length and may include only numeric characters. Alternatively, in another implementation, each of the OTPs may be eight characters in length and may include case sensitive alphanumeric characters. In an example implementation, a first OTP may include five numeric characters, a second OTP may include four alphabetical characters, a third OTP may include seven alphanumeric characters, a fourth OTP may include five symbols, and so on. In certain example implementations, the OTPs can include any other number of characters and/or can include any combination of letters, numerals, and symbols.

According to certain example implementations of the disclosed technology, the identity authentication may be based on independent information, for example: whether the identity information has previously been reported; whether the address on the application matches an address previously reported; whether the social security number on the application has been previously reported with a different identity; whether the identity has only been reported by credit bureau sources; whether the identity has been the subject of recent account opening inquiries; or whether the identity has a history of derogatory or high risk events. According to an example implementation, other additional independent information may be utilized without departing from the scope of the disclosed technology.

In certain example implementations, the independent information may include source records such as property deeds, credit bureau identity files, utility connects and disconnects, driver licenses, voter registrations, phone book directories, etc. Example implementations of the disclosed technology may aggregate and process such information to locate inconsistencies and/or patterns that may further identify certain types of identity fraud.

In an example implementation, a risk score, a risk type, and/or warning codes may be generated at one or more stages of the multi-stage identity authentication process. For example, the risk score may indicate a likelihood that an application or request for service will result in fraud if the account is opened.

In accordance with certain example implementations of the disclosed technology, the applicant- or subject-supplied initial set of identifying information (such as personal identity information) may be analyzed to determine if such information corresponds to conditions that indicate high identity fraud risk. For example, a social security number (SSN) can be checked to determine if it is valid or not. An invalid SSN, a SSN supplied by the applicant that corresponds to a person who has been reported as deceased, an SSN issued prior to the applicant's date-of-birth; and/or a SSN used by multiple different identities would all be indicators of high identity fraud risk. Another indicator of high identity fraud risk includes multiple suspicious identities at the applicant's address. In certain example implementations, such factors may be taken into account to allow or deny the combined KBA/OTP authentication process to continue.

According to example implementations, the applicant's residential address history may be taken into account for determining identity fraud risk. For example, the length of residence at one or more addresses, the number of address moves, and/or the number of utility connects and disconnects may be indicators of identity fraud.

According to example implementations, certain technical effects can be provided, such as creating certain systems and methods that may reduce fraud losses and improve operational efficiency. Example implementations of the disclosed technology can provide the further technical effects of providing systems and methods for detecting identity fraud. Certain implementations of the disclosed technology may further provide the technical effects of authenticating a subject's identity via a combined KBA and OTP process.

In example implementations of the disclosed technology, the identity authentication process 100 may be implemented using any number of hardware and/or software applications that are executed to facilitate any of the operations. In example implementations, one or more I/O interfaces may facilitate communication between the identity authentication system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the identity authentication system 200. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the identity authentication system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, implementations of the disclosed technology may include the identity authentication system 200 with more or less of the components illustrated in FIG. 2 or FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method comprising:
   receiving a set of identity information associated with a subject;
   querying one or more databases with at least a portion of the set of identity information;
   receiving, in response to the querying, personally identifiable information;
   producing, with one or more computer processors, and based at least in part on the personally identifiable information, at least one knowledge based authentication (KBA) identity proofing question having a personally identifiable correct answer;

generating a unique correct one-time pass (OTP) code for the personally identifiable correct answer;

generating one or more incorrect answers with corresponding incorrect codes;

outputting, via a first communication channel, the at least one KBA identity proofing question;

outputting, via a second communication channel that differs from the first communication channel, the personally identifiable correct answer with the unique correct OTP code, and the one or more incorrect answers with the corresponding incorrect codes;

receiving, via the first communication channel, a response code;

comparing the response code and the unique correct OTP code; and responsive to a match between the response code and the unique correct OTP code, outputting a first indication of authentication.

2. The method of claim 1, further comprising:

receiving new biometric information associated with the subject;

querying one or more databases for previously stored biometric information associated with the subject;

comparing the new biometric information with the previously stored biometric information; and responsive to a match between the new and previously stored biometric information, outputting a second indication of authentication.

3. The method of claim 2, wherein the biometric information comprises one or more of: fingerprint image, voiceprint, facial feature image, and iris image.

4. The method of claim 2, further comprising outputting a mismatch indication responsive to one or more of a comparison mismatch between the new and previously stored biometric information and a comparison mismatch between the response code and the unique correct OTP code.

5. The method of claim 1, wherein receiving the set of identity information comprises receiving, as applicable, one or more of: a name, an address, a birth date, a phone number, at least portion of a social security number, an IP address, a location, and a communication device electronic fingerprint.

6. The method of claim 1, wherein the first communication channel is configured for communication with a first computing device associated with the subject, and wherein the second communication channel is configured for communication with a second computing device associated with the subject.

7. The method of claim 1, wherein the unique correct one-time pass (OTP) code and the incorrect codes comprise one or more alphanumeric codes.

8. A system comprising:

at least one memory for storing data and computer-executable instructions; and at least one processor configured to access the at least one memory and further configured to execute the computer-executable instructions to:

receive a set of identity information associated with a subject;

query one or more databases with at least a portion of the set of identity information;

receive, in response to the querying, personally identifiable information;

produce, with the at least one processor, and based at least in part on the personally identifiable information, at least one knowledge based authentication (KBA) identity proofing question having a personally identifiable correct answer;

generate a unique correct one-time pass (OTP) code for the personally identifiable correct answer;

generate one or more incorrect answers with corresponding incorrect codes;

output, via a first communication channel, the at least one KBA identity proofing question;

output, via a second communication channel that differs from the first communication channel, the personally identifiable correct answer with the unique correct OTP code, and the one or more incorrect answers with the corresponding incorrect codes;

receive, via the first communication channel, a response code;

compare the response code and the unique correct OTP code; and responsive to a match between the response code and the unique correct OTP code, output a first indication of authentication.

9. The system of claim 8, wherein the at least one processor is further configured to execute the computer-executable instructions to:

receive new biometric information associated with the subject;

query one or more databases for previously stored biometric information associated with the subject;

compare the new biometric information with the previously stored biometric information;

responsive to a match between the new and previously stored biometric information, output a second indication of authentication; and responsive to a mismatch between the new and previously stored biometric information, output an indication of a mismatch.

10. The system of claim 8, wherein the set of identity information comprises one or more of: a name, an address, a birth date, a phone number, at least portion of a social security number, an IP address, a location, and a communication device electronic fingerprint.

11. The system of claim 8, wherein the first communication channel is configured for communication with a first computing device associated with the subject, and wherein the second communication channel is configured for communication with a second computing device associated with the subject.

12. The system of claim 8, wherein the at least one processor is further configured to output an indication of mismatch responsive to a comparison mismatch between the response code and the unique correct OTP code.

13. A non-transitory computer-readable media comprising computer-executable instructions that, when executed by one or more processors, cause the one or more processors to perform a method comprising:

receiving a set of identity information associated with a subject;

querying one or more databases with at least a portion of the set of identity information;

receiving, in response to the querying, personally identifiable information;

producing, with one or more computer processors, and based at least in part on the personally identifiable information, at least one knowledge based authentication (KBA) identity proofing question having a personally identifiable correct answer;

generating a unique correct one-time pass (OTP) code for the personally identifiable correct answer;

generating one or more incorrect answers with corresponding incorrect codes;

outputting, via a first communication channel, the at least one KBA identity proofing question;

outputting, via a second communication channel that differs from the first communication channel, the personally identifiable correct answer with the unique correct OTP code, and the one or more incorrect answers with the corresponding incorrect codes;

receiving, via the first communication channel, a response code;

comparing the response code and the unique correct OTP code; and responsive to a match between the response code and the unique correct OTP code, outputting a first indication of authentication.

14. The non-transitory computer-readable media of claim 13, further comprising computer-executable instructions that cause the one or more processors to:

receive new biometric information associated with the subject, wherein the biometric information comprises one or more of: fingerprint image, voiceprint, facial feature image, and iris image;

query one or more databases for previously stored biometric information associated with the subject;

compare the new biometric information with the previously stored biometric information;

responsive to a match between the new and previously stored biometric information, output a second indication of authentication; and responsive to a mismatch between the new and previously stored biometric information, output a mismatch indication.

15. The non-transitory computer-readable media of claim 13, wherein receiving the set of identity information comprises receiving, as applicable, one or more of: a name, an address, a birth date, a phone number, at least portion of a social security number, an IP address, a location, and a communication device electronic fingerprint.

16. The non-transitory computer-readable media of claim 13, further comprising computer-executable instructions that cause the one or more processors to output a mismatch indication responsive to a comparison mismatch between the response code and the unique correct OTP code.

17. The non-transitory computer-readable media of claim 13, wherein the unique correct one-time pass (OTP) code and the incorrect codes comprise one or more alphanumeric codes.

* * * * *